United States Patent
Kao et al.

(10) Patent No.: US 11,816,488 B2
(45) Date of Patent: Nov. 14, 2023

(54) METHOD AND APPARATUS FOR DYNAMICALLY SIMPLIFYING PROCESSOR INSTRUCTIONS

(71) Applicant: HUAWEI TECHNOLOGIES CO., LTD., Shenzhen (CN)

(72) Inventors: Henry Fangli Kao, Calgary (CA); Shehab Yomn Abdellatif Elsayed, Toronto (CA); Tomasz Sebastian Czajkowski, Etobicoke (CA); Reza Azimi, Aurora (CA); Ehsan Amiri, Thornhill (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1 day.

(21) Appl. No.: 17/523,560

(22) Filed: Nov. 10, 2021

(65) Prior Publication Data
US 2023/0145754 A1    May 11, 2023

(51) Int. Cl.
*G06F 9/30* (2018.01)
*G06F 9/38* (2018.01)

(52) U.S. Cl.
CPC ........ *G06F 9/30181* (2013.01); *G06F 9/3016* (2013.01); *G06F 9/3802* (2013.01); *G06F 9/3832* (2013.01)

(58) Field of Classification Search
CPC .. G06F 9/30181; G06F 9/3016; G06F 9/3802; G06F 9/3832
See application file for complete search history.

(56) References Cited

U.S. PATENT DOCUMENTS

| | | | | |
|---|---|---|---|---|
| 7,502,918 B1* | 3/2009 | Barowski | ............... | G06F 9/3836 |
| | | | | 712/226 |
| 10,706,498 B2* | 7/2020 | Nurvitadhi | .......... | G06F 12/0831 |
| 2010/0106947 A1* | 4/2010 | Moloney | ............. | G06F 9/30101 |
| | | | | 712/E9.017 |
| 2015/0220345 A1* | 8/2015 | Corbal | .................. | G06F 9/3836 |
| | | | | 712/214 |

OTHER PUBLICATIONS

M. H. Lipasti and J. P. Shen, "Exceeding the dataflow limit via value prediction," Proceedings of the 29th Annual IEEE/ACM International Symposium on Microarchitecture. Micro 29, 1996, pp. 226-237.

(Continued)

*Primary Examiner* — Shawn Doman

(57) ABSTRACT

There is provided methods and devices for dynamically simplifying processor instructions. A method includes receiving, at a computing device, processor instructions and determining, by the computing device, if instruction simplification is enabled for an instruction being processed. The method further includes determining, by the computing device, from an instruction simplification table if the instruction is capable of being simplified and scheduling, by the computing device, a simplified instruction based on the determination from the instruction simplification table. A device includes a processor, and a non-transient computer readable memory having stored thereon instructions which when executed by the processor configure the device to execute the methods disclosed herein.

12 Claims, 6 Drawing Sheets

(56) References Cited

OTHER PUBLICATIONS

S. Balakrishnan and G. S. Sohi, "Exploiting value locality in physical register files," Proceedings. 36th Annual IEEE/ACM International Symposium on Microarchitecture, 2003. Micro-36., 2003, pp. 265-276.
M. M. Islam and P. Stenstrom, "Energy and Performance Trade-offs between Instruction Reuse and Trivial Computations for Embedded Applications," 2007 International Symposium on Industrial Embedded Systems, 2007, pp. 86-93.
S. E. Richardson, "Exploiting trivial and redundant computation," Proceedings of IEEE 11th Symposium on Computer Arithmetic, 1993, pp. 220-227.
E. Atoofian and A. Baniasadi, "Improving energy-efficiency by bypassing trivial computations," 19th IEEE International Parallel and Distributed Processing Symposium, 2005, pp. 1-7.
J. J. Yi and D. J. Lilja, "Improving processor performance by simplifying and bypassing trivial computations," Proceedings. IEEE International Conference on Computer Design: VLSI in Computers and Processors, 2002, pp. 462-465.
S. Kim, "Reducing ALU and Register File Energy by Dynamic Zero Detection," 2007 IEEE International Performance, Computing, and Communications Conference, 2007, pp. 365-371.
M. M. Islam and P. Stenstrom, "Reduction of Energy Consumption in Processors by Early Detection and Bypassing of Trivial Operations," 2006 International Conference on Embedded Computer Systems: Architectures, Modeling and Simulation, 2006, pp. 28-34.
S. Sen et al., SparCE: Sparsity Aware General-Purpose Core Extensions to Accelerate Deep Neural Networks, IEEE Transactions of Computers, p. 99, Nov. 2017.
V. Petric et al. RENO: a rename-based instruction optimizer ISCA'05, Madison, WI, USA, 2005.

* cited by examiner

METHOD AND APPARATUS FOR DYNAMICALLY SIMPLIFYING PROCESSOR INSTRUCTIONS

CROSS-REFERENCE TO RELATED APPLICATIONS

This is the first application filed for the present disclosure.

FIELD

The present disclosure pertains to the field of computer engineering, and in particular to a microarchitecture capable of dynamically simplifying instructions based on register values.

BACKGROUND

Processor instructions may be simplified (i.e., transformed) by compilers to an equivalent lower-latency instruction if the value of its operands is known statically, that is, at compile time. However, the common case is that the values that reside in different processor registers are not known statically, and may change during the execution of a program. Many programs exhibit high value-locality, which describes the frequency of observing the same value in a storage location (e.g., register) over multiple observations. These reoccurring values are often 0 and 1, which are values that can simplify arithmetic instructions such as multiplication and division.

Accordingly, there is a need for methods to leverage value-locality in order to dynamically simplify high-latency instructions into simpler, low-latency instructions, that are not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present disclosure is to provide methods and devices for dynamically simplifying instructions based on register values.

An aspect of the disclosure provides for a method for dynamically simplifying processor instructions. The method includes receiving, at a computing device, processor instructions. The method further includes determining, by the computing device, if instruction simplification is enabled for an instruction being processed. The method further includes determining, by the computing device, from an instruction simplification table if the instruction is capable of being simplified. The method further includes scheduling, by the computing device, a simplified instruction based on the determination from the instruction simplification table.

In some embodiments the method further includes performing, by the computing device, at least one of: a memory read of the simplified instruction, an execution of the simplified instruction, a writeback of data resulting from an execution of the simplified instruction, and a commit of data resulting from an execution of the simplified instruction. In some embodiments receiving, at a computing device, processor instructions further includes at least one of: fetching, by the computing device, the processor instructions from an instruction cache, and decoding, by the computing device, the processor instructions. In some embodiments determining, by the computing device, if instruction simplification is enabled for the instruction being processed further includes determining, by the computing device, from an instruction simplification register file if the registers used by the instruction contain values of interest. In some embodiments the instruction simplification register file is in communication with the instruction simplification table. In some embodiments the computing device is able to access register values during instruction scheduling. In some embodiments the access to register values is through an architectural register file. In some embodiments the computing device is unable to access register values during instruction scheduling. In some embodiments the computing device is able to access a physical register file. In some embodiments the instruction simplification table is only able to simplify specific instructions in an instruction set architecture. In some embodiments the instruction simplification table is a lookup table.

An advantage of the embodiments disclosed herein is that dynamic instruction simplifying enables a central processing unit (CPU) to execute a sequence of instructions faster by: (1) replacing higher-latency instructions with lower-latency equivalents (if they exist), (2) not executing instructions if applicable and (3) potentially resolving data dependencies on prior instructions. Further, one or more of the embodiments disclosed herein may be applied to processor architecture. In some embodiments, power and area savings are an advantage when not requiring an instruction simplification register file (ISRF), since values for registers can already be obtained from the existing architectural register file (ARF) before instruction scheduling.

Another aspect of the disclosure provides for a computing device. The computing device includes a processor, and a non-transient computer readable memory having stored thereon machine executable instructions which when executed by the processor configure the device to execute the methods disclosed herein. For example, such a computing device is configured to receive processor instructions, determine if instruction simplification is enabled for an instruction being processed, determine from an instruction simplification table if the instruction is capable of being simplified, and schedule a simplified instruction based on the determination from the instruction simplification table.

Embodiments have been described above in conjunctions with aspects of the present disclosure upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
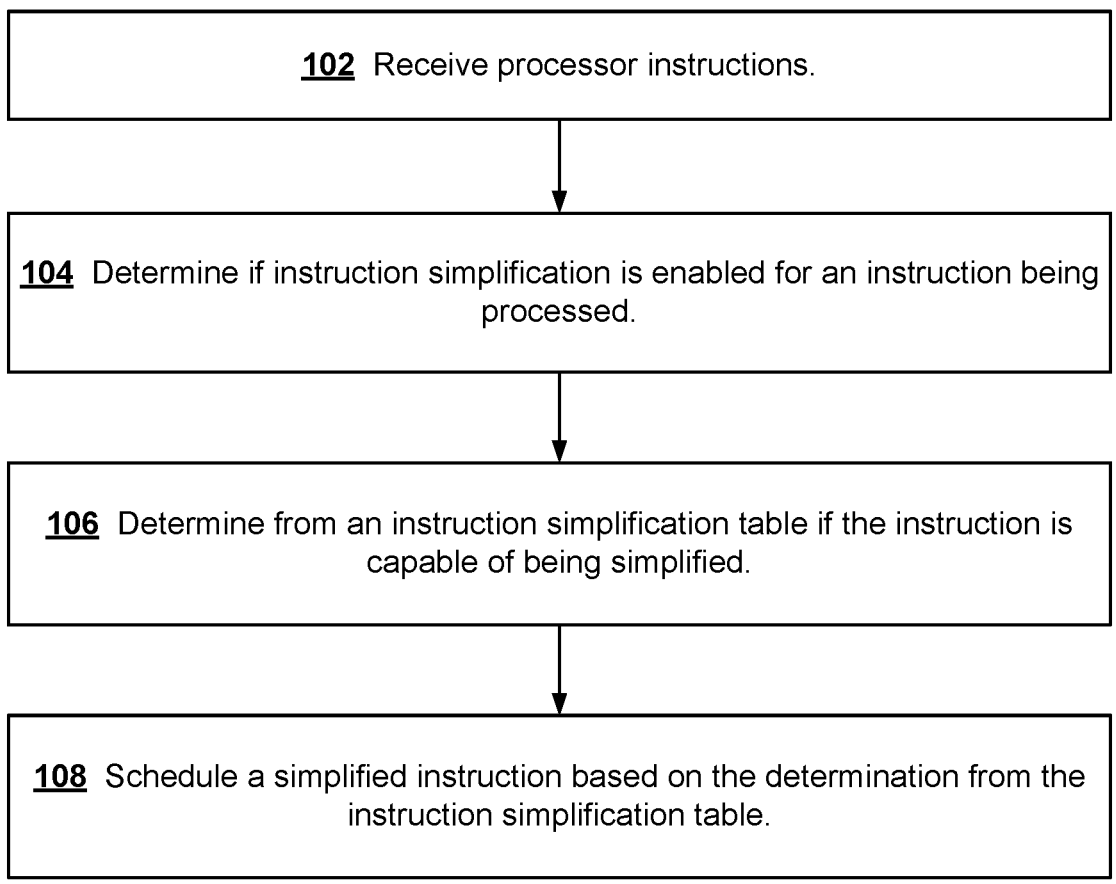
FIG. 1 illustrates a method for dynamically simplifying processor instructions, according to embodiments.

Dynamic instruction simplification (i.e., simplification during execution of the program) can both reduce the number of cycles needed to complete an instruction, and also may resolve read-after-write (RAW) dependencies across instructions which can cause instructions to stall, wasting processor cycles.

Certain instructions in the instruction set architecture (ISA) may be simplified if the values of its operands are known, turning long-latency instructions into low-latency instructions that complete an equivalent operation. Consider the sequence of instructions shown in Equation 1. The first instruction (load) will load the value stored in memory at the address in the source operand register R2 into destination operand register R1. The second instruction will multiply the values of the source operands, R1 and R3, and store the result into destination register R4. This sequence also contains a read-after-write (RAW) dependency, which means that the source operand R1, for the multiply instruction, depends on the value loaded by the preceding load instruction. Hence, the multiply instruction must wait for the load instruction to complete before it may execute.

$$\text{load R1,R2}$$
$$\text{multiply R4,R1,R3} \quad (1)$$

Some instructions may be simplified if the values in the source and destination registers are known during instruction scheduling. For example, if register R3 is known to be 0, the result of the multiplication between values in R1 and R3 will naturally be zero. The multiplication instruction can then be renamed into a move instruction instead, as shown in Equation 2. The move instruction will therefore store 0 into R4, accomplishing the same task as the original multiplication instruction of Equation 1. This instruction transformation has two benefits: firstly, the same task may be accomplished by a lower-latency instruction (a move instruction) compared to a more computationally expensive higher-latency instruction (a multiply instruction). In addition, the RAW dependency is resolved in that the move instruction no longer depends on the preceding load instruction to finish before it may execute. Furthermore, if it is known that register R4 also holds the value of 0, then 0 is being stored to a register that already holds 0. This would therefore be a redundant operation and may be further simplified by not executing the instruction at all. This type of transformation may offer better performance and energy savings, however modern CPUs do not have the capability to do such renaming of instructions based on register values.

$$\text{load R1,R2}$$
$$\text{move R4,0} \quad (2)$$

Embodiments of the present disclosure provide a CPU microarchitecture for dynamically simplifying instructions based on register values during the instruction scheduling phase of the CPU pipeline, which may also be referred to as a processor pipeline. Embodiments of the present disclosure provide the inclusion of an instruction simplification register file (ISRF) unit and an instruction simplification table (IST) unit. In particular, the ISRF tracks which registers contain values-of-interest (VOI). A VOI is a register value that may lead to the simplification of some instructions to be performed by the processor (for example, a value of −1, 0, 1). Source and destination registers of an instruction can be checked if they contain a VOI during instruction scheduling via the ISRF. The IST subsequently queries if one or more of the registers contain a VOI. A simplified instruction can be returned from the IST if a simplified instruction exists which can replace the original instruction.

An advantage of the ISRF is that it allows the processor or processor core to know if one or more of the input or output registers of a certain instruction contains a VOI. The ISRF provides this information to the processor during instruction scheduling without having to increase the complexity of the main register file by adding additional read ports or interfere with instructions at later stages in the processor pipeline that are already accessing the main register file.

Similarly, the IST provides the processor or processor core with lower-latency alternatives to the current instruction. The IST can use the output from the ISRF in addition to the current instruction being scheduled to search for a faster equivalent instruction that achieves the same end result as the original instruction. The processor pipeline disclosed herein allows the processor or processor core to probe or obtain information from the ISRF and IST during instruction scheduling in order to determine if a faster equivalent instruction is available or not and subsequently replace the original instruction with the faster equivalent instruction.

FIG. 1 is flowchart of an example method 100 for dynamically simplifying processor instructions. The method 100 involves, at step 102, receiving, at a computing device, processor instructions. The method 100 further involves, at step 104, determining, by the computing device, if instruction simplification is enabled for an instruction being processed. The method 100 further involves, at step 106, determining, by the computing device, from an instruction simplification table if the instruction is capable of being simplified. The method 100 further involves, at step 108, scheduling, by the computing device, a simplified instruction based on the determination from the instruction simplification table. It is understood that the simplified instructions can be an equivalent instruction to the original instruction, while the equivalent instruction (or simplified instruction) can be faster or more efficient to process by the processor than the original instruction.

In some embodiments a method, such as method 100, may further include performing, by the computing device, a memory read of the simplified instruction, execution of the simplified instruction, a writeback of data resulting from the execution of the simplified instruction, and a commit of data resulting from the execution of the simplified instruction.

In some embodiments receiving, at a computing device, processor instructions further includes fetching, by the computing device, the processor instructions from an instruction cache, and decoding, by the computing device, the fetched processor instructions.

In some embodiments, the dynamic instruction simplification of the instant disclosure is implemented in a processor pipeline that does not have access to the architectural register file during instruction scheduling (i.e., register values are not known during the instruction scheduling phase). The processor pipeline of such an embodiment can include an instruction simplification register file (ISRF) unit and an instruction simplification table (IST).

Figure 2:
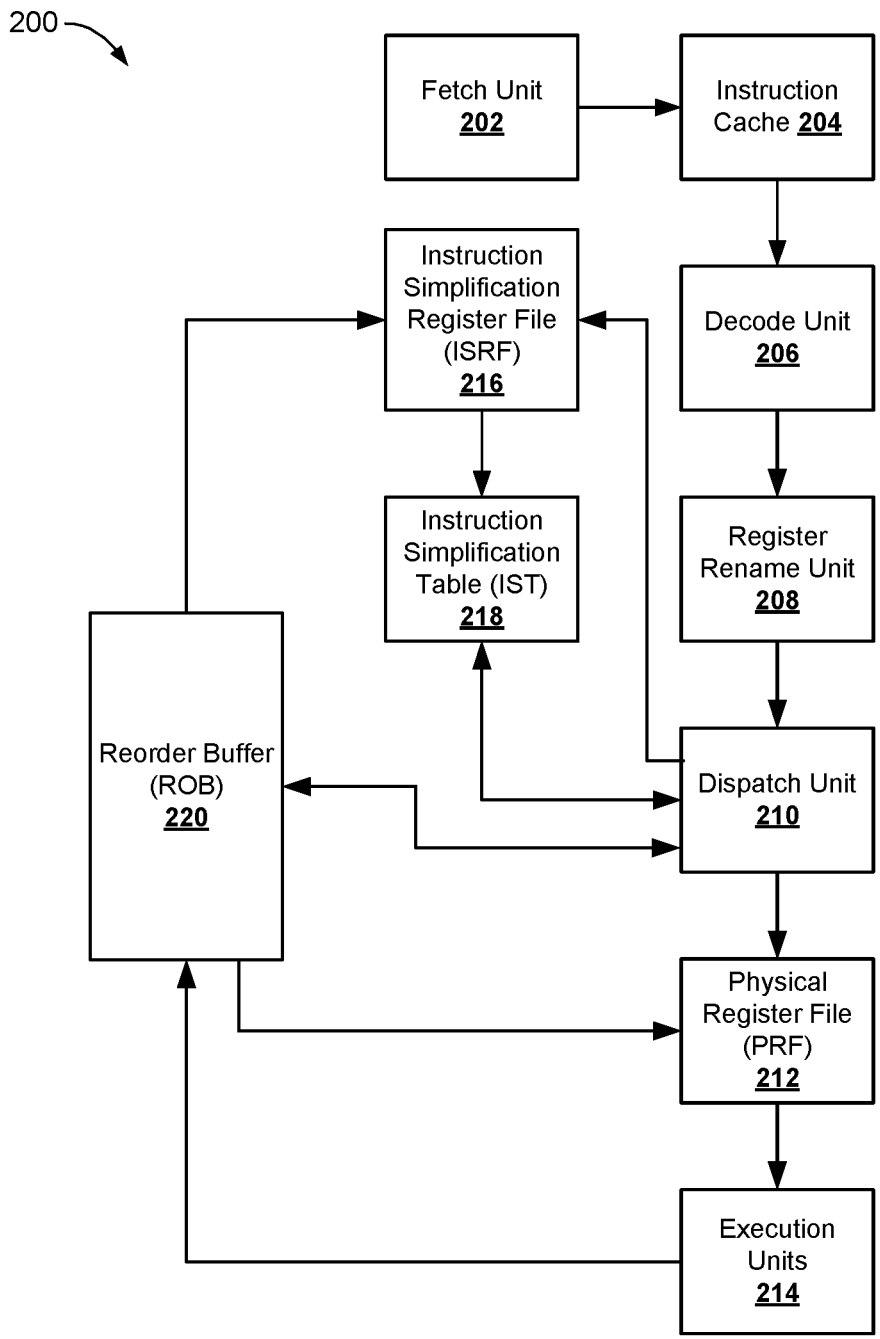
FIG. 2 illustrates a block diagram of a processor pipeline architecture, according to embodiments.

FIG. 2 is an example block diagram 200 of a processor pipeline architecture according to an embodiment in which a processor pipeline does not have access to the architectural register file during instruction scheduling. The processor pipeline begins with the instruction fetch unit 202 which fetches instructions from the instruction cache 204. Fetched instructions are decoded in the decode unit 206. Decoded instructions will have architectural registers as their operands. These architectural registers will be renamed into physical registers in the register rename unit 208. Instructions with renamed registers will be scheduled for execution by first placing these instructions into reservation stations (not shown) in the dispatch unit 210 and also placing these instructions into an entry of the reorder buffer (ROB) 220. These instructions will be buffered in their respective reservation stations until ready to execute. Once ready to execute, the instruction will first obtain values for its register operands by accessing the physical register file (PRF) 212 before execution. Once finished executing, the results will be written to the ROB 220.

Each entry of the ROB 220 holds information of each instruction placed into the reservation stations in addition to the result values of the executed instruction. The instructions are tracked in program order. The ROB 220 also retires instructions in program-order, and commits the results to the PRF 212.

In order to enable dynamic instruction simplification in this embodiment, the ISRF 216 and the IST 218 are utilized.

First, the ISRF 216 tracks which physical registers contain VOIs. The ISRF 216 contains an entry for each physical register. This entry includes one or more bits of information that encodes which of the physical register's value is a VOI, and the value of the VOI. The number of bits depends on the number VOIs that are supported for the implementation (e.g., 1-bit for 1 VOI, 2-bits for 2 VOIs, etc.). The ISRF 216 is updated when instruction results are committed by the ROB 220, in the same manner as typical for the PRF 212, however each value of these results will be compared to each VOI that is supported in the implementation. If the value matches one of the VOIs, the entry for the corresponding register in the ISRF 216 will be set to encode the matched VOI.

Second, the IST 218 may be implemented as a lookup table, containing simplification methods for the instructions. In some embodiments the IST 218 is in communication with the ISRF 216. The number of simplification methods supported by the IST 218 can depend on implementation. If an instruction with register values that contain VOIs (which are known and identified by the ISRF) is being scheduled, the dispatch unit 210 will query the IST 218 with the instruction's opcode, and the ISRF 216 with the instruction's source and destination operands. The ISRF 216 will communicate with the IST 218 which operand contains a VOI. A control register in the IST 218 may enable or disable dynamic instruction simplification. The instruction will be transformed if the IST 218 contains a simplification method for the given instruction and VOI operands, and if the control register is enabled. The instruction will not be transformed if the IST's 218 control register is disabled. If the instruction is transformed, then it will be allocated into the reservation station and ROB 220 entry in the simplified form.

The control register for the IST 218 to enable or disable dynamic instruction simplification may be set or unset by instructions implemented into the instruction set architecture (ISA). These instructions may be inserted into the code by a programmer, or through a compiler. An instruction to enable the IST's 218 control register can be inserted before a region of code where dynamic instruction simplification is desired. Similarly, an instruction is inserted after the region of code in order to disable dynamic instruction simplification.

Figure 3:
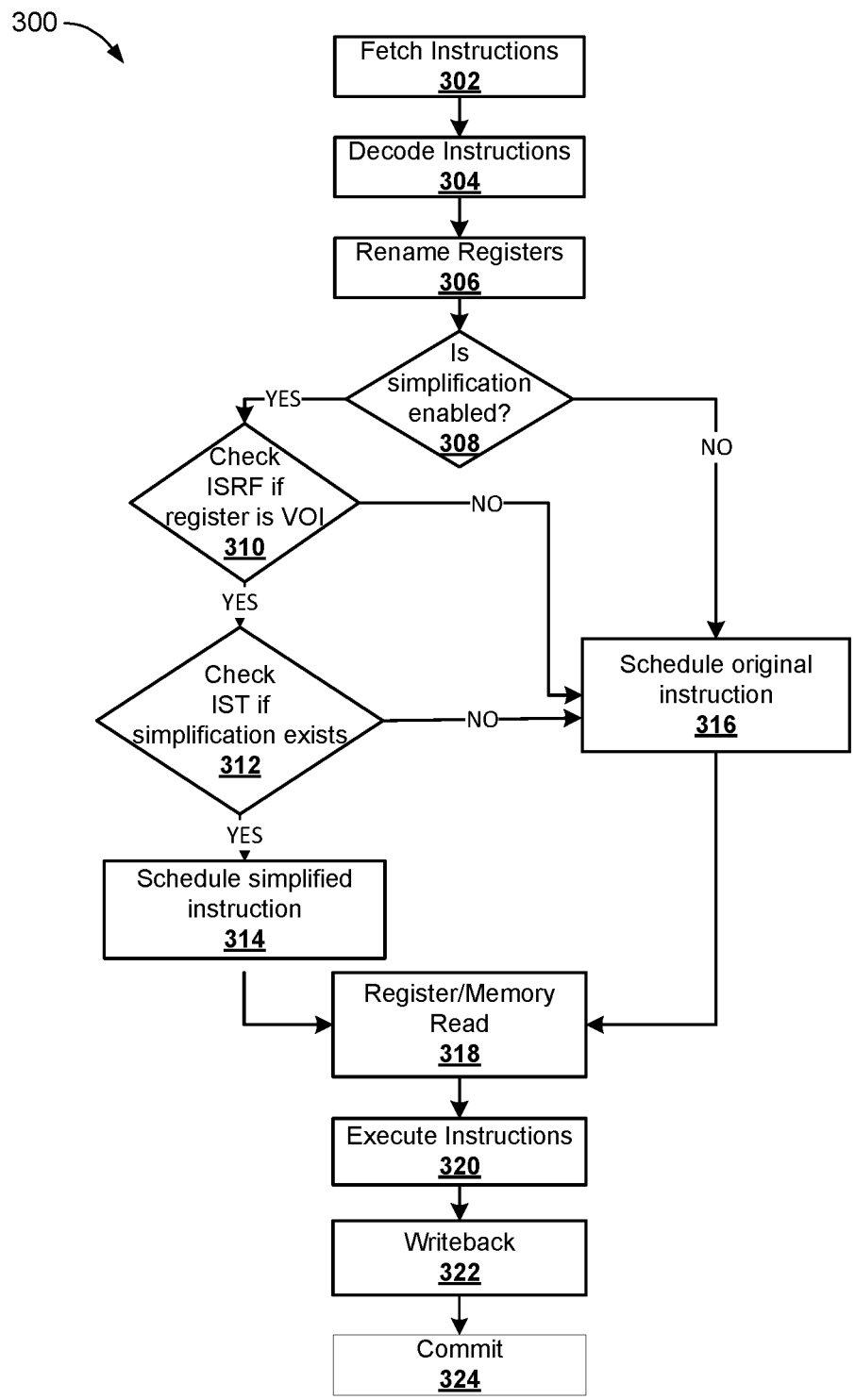
FIG. 3 illustrates a flowchart depicting operation of dynamic instruction simplification, according to embodiments.

FIG. 3 is an example flowchart 300 depicting operation of the dynamic instruction renaming microarchitecture according to an embodiment. At step 302, instructions are fetched from the instruction cache. At step 304, the fetched instructions are then decoded. At step 306, architectural registers are then renamed to physical registers during register renaming. At step 308, the dynamic instruction simplification control register in the IST is checked during instruction scheduling. In some embodiments determining if instruction simplification is enabled for a certain instruction being processed further includes determining from an ISRF if registers used by the instruction contain a value of interest (VOI). If simplification is disabled, the instruction follows the original pipeline path to step 316 and is scheduled as originally defined. Otherwise, if simplification is enabled, the instructions follow the dynamic instruction simplification path. In the dynamic instruction simplification path, at step 310, if the instruction's operands contain VOIs known from the ISRF and, at step 312, a simplification method is supported in the IST, then the instruction may be transformed and scheduled as the simplified version of the instruction at step 314. Otherwise the instruction will be scheduled in its original form (step 316). The instruction is then dispatched into its execution units, which includes register file/memory read at step 318, execution at step 320, writeback of results to the ROB at step 322, and finally committing the results at step 324. Register values in the physical register file and ISRF are updated at the commit stage (step 324). The ISRF will check if the committed value is one of the supported VOIs. If it the committed value is a supported VOI, then the bits in the corresponding entry of the ISRF will be updated accordingly.

Figure 4:
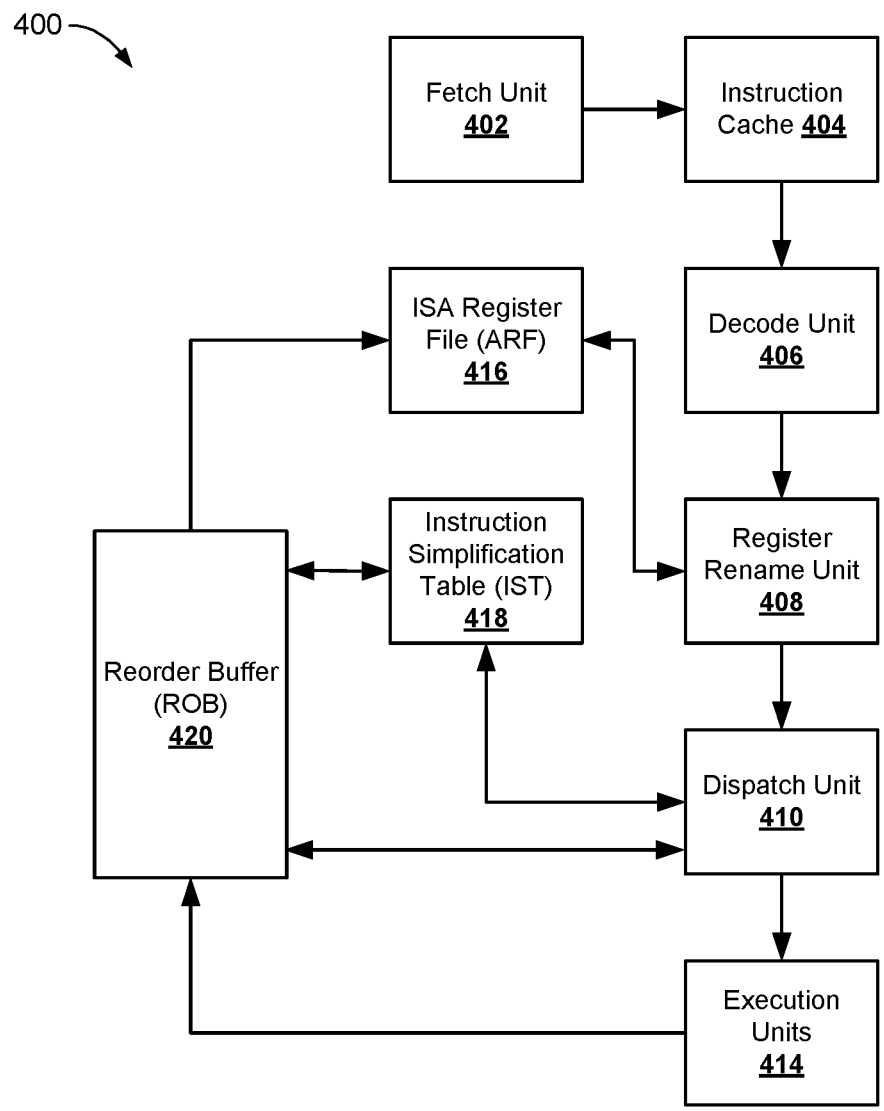
FIG. 4 illustrates a block diagram of a processor pipeline architecture, according to embodiments.

In some embodiments, the central processing unit (CPU) does have access to register values during instruction scheduling through the architectural register file (ARF). FIG. 4 is an example block diagram 400 of a processor pipeline architecture according to an embodiment in which a processor pipeline does have access to register values during instruction scheduling. The ARF 416 holds committed values from the ROB 420. Unlike the register rename unit 208 from FIG. 2 where architectural registers are renamed into physical registers, the register rename unit 408 will copy the values read from the ARF 416 for each of the instruction's operands during scheduling. The ISRF 216 of FIG. 2 is not a necessary component for this embodiment since register values are already known before the instructions are scheduled in the dispatch unit 410. The IST 418 remains the same as that in FIG. 2, and will be queried by the dispatch unit 410 when the instruction's operands are VOIs. The remaining elements of FIG. 4 which are not discussed may be taken to perform substantially the same function as their counterparts in FIG. 2.

Figure 5:
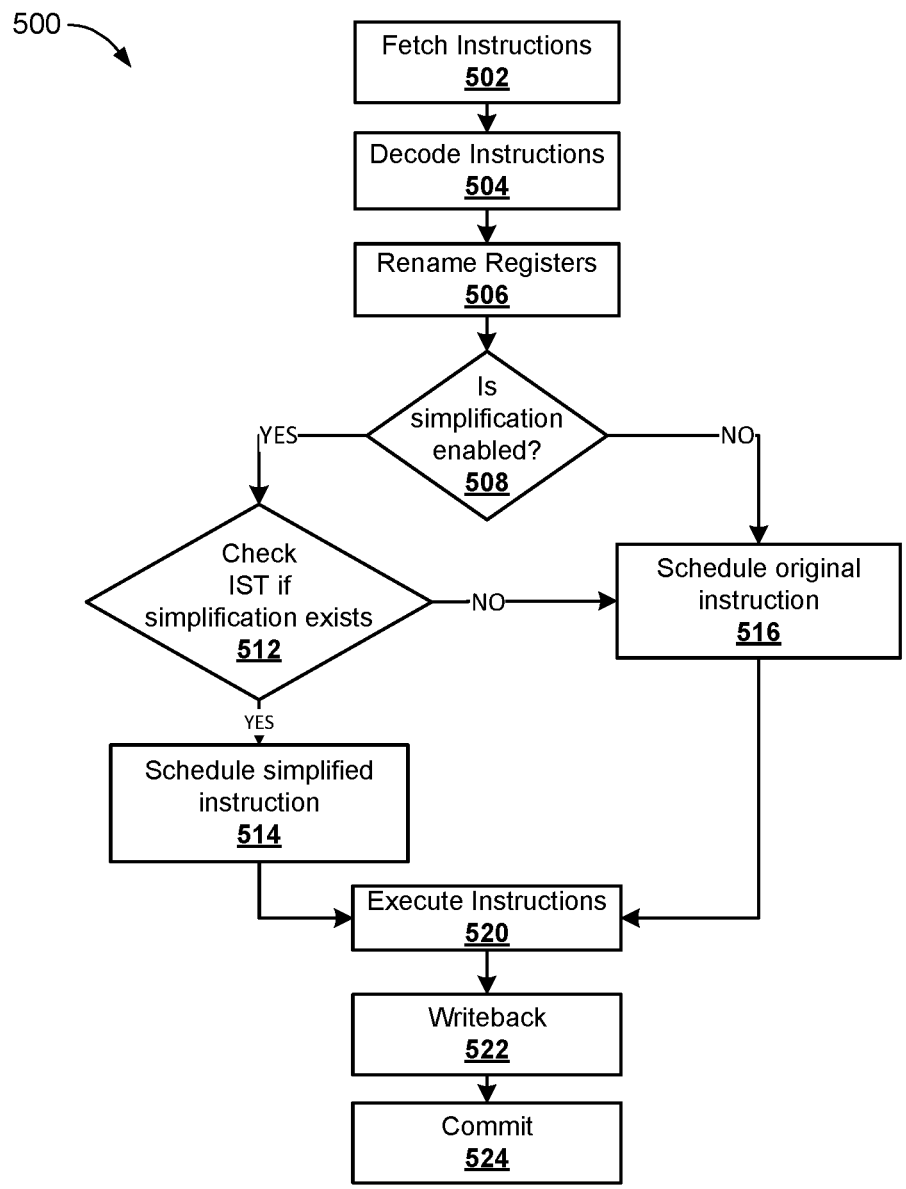
FIG. 5 illustrates a flowchart depicting operation of dynamic instruction simplification, according to embodiments.

FIG. 5 depicts a flowchart 500 illustrating operation of the dynamic instruction renaming microarchitecture according to an embodiment. At step 502, instructions are fetched from the instruction cache. At step 504, the fetched instructions are then decoded. At step 506, architectural registers values are stored in the ARF. Register renaming will copy the values of the corresponding registers into the reservation stations where the instruction will be held. At step 508, the dynamic instruction simplification control register in the IST is checked during instruction scheduling. If disabled, then the instruction follows the original pipeline path (step 516) and is scheduled as originally defined. Otherwise, if enabled, the instruction follows the dynamic instruction simplification path. In the dynamic instruction simplification path, with the known values of the registers from the ARF, at step 512, the IST is queried for a simplification method. The instruction and its operands are transformed if the IST returns a valid simplification method for the given instruction and VOI operands and, at step 514, is scheduled in its simplified form. Otherwise, if the instruction does not have any VOI operands, or does not have a valid simplification method, then the instruction will not be simplified and, at step 516, be scheduled in its original form. The instruction is then dispatched into its execution units which include execution at step 520, writeback of results at step 522, and finally committing the results at step 524. Register values in the ARF are updated in the commit stage, step 524.

In some embodiments, the IST's control register may not be required. Instead, and in some embodiments, the IST may only able to dynamically simplify specific instructions in the ISA. Instead of implementing instructions for enabling or disabling the IST's control register, certain instructions in the ISA can be duplicated. These duplicate instructions can complete the same task as their respective original instructions, however the duplicates are allowed to be dynamically simplified by the IST. An example is shown below in Equation 3.

load R1,R2 multiply R4,R1,R3 multiply_ds R5,R6,R3 (3)

The first instruction (a load instruction) will load the value stored in memory at the address in the source operand register R2 into destination operand register R1. The second instruction (a multiply instruction) will multiply the values of the source operands, R1 and R3, and store the result into destination register R4. This multiply instruction is followed by a dynamically simplifiable multiply instruction (multiply_ds), with the same functionality as the original multiply instruction, however the multiply_ds instruction is amenable for dynamic instruction simplification.

Assuming R3 contains the value 0, and 0 is a VOI, a potential dynamic instruction simplification is shown below in Equation 4. Only the multiply_ds instruction is simplified, and the conventional multiply instruction is untouched.

load R1,R2 multiply R4,R1,R3 move R4,0 (4)

In a region of code where dynamic instruction simplification is desired, the compiler would statically transform the original instruction, into its duplicate simplifiable form if implemented into the ISA. During program execution, only the simplifiable instructions would be dynamically simplified if any of the operands are VOIs and a simplification method exists in the IST.

The benefits or advantages of this embodiment include latency reduction by removing the control registers. Enabling or disabling the IST's control registers would require additional instruction to be inserted into the code, thereby increasing the dynamic instruction count. It is understood that the dynamic instruction count remains the same using the method as defined in the above embodiment.

It will be understood that embodiments of the present disclosure disclosed herein may be applied to a variety of processor architectures, including but not limited to out-of-order processors, in-order processors, very long instruction word (VLIW) processors and graphics processing units (GPUs). Furthermore, embodiments of the present disclosure disclosed herein may be applied to a variety of instruction set architectures (ISA), including but not limited to ARM, MIPS, RISC-V and X86.

In addition to providing the benefits of dynamic instruction simplification, the ISRF also provides an additional benefit of improving execution of branch code. Branch code (or branching) refers to a second set of processor instructions. For example, consider the sequence of instructions in Equation 5 which is an example of branching. First, the compare instruction will compare if the value in register R1 is equal to 1. If the comparison is true, then the subsequent branch instructions, branch_equals, will jump to the label TRUE and resume execution from there. Otherwise if the comparison returns false, then the branch_equals instruction follows through to the next instruction, starting from the FALSE label.

compare R1,1 branch_equals TRUE

FALSE:

{false code block}

TRUE:

{true code block} (5)

A conventional processor pipeline would either have to: (1) stall the branch_equals instruction until the compare instruction reads the R1 values from the PRF in order to obtain a result for the comparison, or (2) speculatively execute either the FALSE code block or TRUE code block. The speculative execution of either code block will have to be reverted if the result of the compare instruction is not equivalent to the speculation result selected. In either case, this can add additional latency to the instructions due to stalling, or incorrect speculation.

In some embodiments of the present disclosure, the ISRF provides values during the instruction scheduling phase. Using the same code sequence as above, if value 1 is a VOI, and R1 is known to contain 1 during the scheduling phase, then the result of the compare instruction is known immediately. The branch instruction will not have to stall or speculatively execute one of the code blocks which may risk incorrect speculation. As a result, these can be a reduction of latency on branch code.

Figure 6:
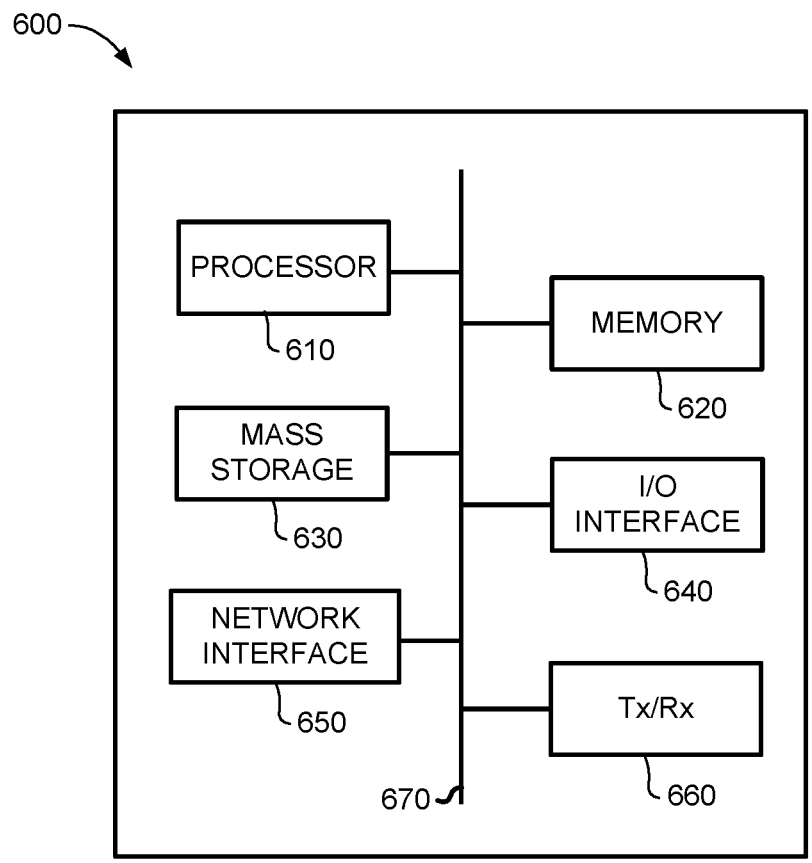
FIG. 6 illustrates a block diagram of an electronic device used for implementing methods disclosed herein, according to embodiments.

FIG. 6 is a schematic diagram of an electronic device 600 that may perform any or all of the steps of the above methods and features described herein, according to different embodiments of the present disclosure. For example, a user equipment (UE), base transceiver station (BTS), base station, wireless gateway or mobility router may be configured as the electronic device. It may be noted that the term "BTS" or "base station" refers to an evolved NodeB (eNB), New Radio (NR) or next generation NodeB (gNodeB or gNB), a radio access node, or another device in a wireless communication network infrastructure, such as a long term evolution (LTE) infrastructure, NR or 5G infrastructure, which performs or directs at least some aspects of wireless communication with wireless communication devices. The term "UE" refers to a device, such as a mobile device, machine-type-communication (MTC) device, machine-to-machine (M2M) equipment, Internet of Things (IoT) device, Internet of Vehicles (IoV) device or other device, which accesses the wireless communication network infrastructure via wireless communication with a base station.

As shown, the device includes a processor 610, memory 620, non-transitory mass storage 630, I/O interface 640, network interface 650, and a transceiver 660, all of which are communicatively coupled via bi-directional bus 670. According to certain embodiments, any or all of the depicted elements may be utilized, or only a subset of the elements. Further, the device 600 may contain multiple instances of certain elements, such as multiple processors, memories, or transceivers. Also, elements of the hardware device may be directly coupled to other elements without the bi-directional bus.

The memory 620 may include any type of non-transitory memory such as static random access memory (SRAM), dynamic random access memory (DRAM), synchronous DRAM (SDRAM), read-only memory (ROM), any combination of such, or the like. The mass storage element 630 may include any type of non-transitory storage device, such as a solid state drive, hard disk drive, a magnetic disk drive, an optical disk drive, USB drive, or any computer program product configured to store data and machine executable program code. According to certain embodiments, the memory 620 or mass storage 630 may have recorded thereon statements and instructions executable by the processor 610 for performing any of the aforementioned method steps described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the methods described herein can be implemented as coded instructions in a computer program product. In other words, the computer program product is a computer-readable medium upon which software code is recorded to execute the methods when the computer program product is loaded into memory and executed on the microprocessor of the wireless communication device.

Acts associated with the methods described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the methods may be executed on any computing device, such as a personal computer, server, PDA, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method for dynamically simplifying processor instructions, the method comprising:
   receiving, at a computing device, processor instructions;
   determining, by the computing device, if instruction simplification is enabled for an instruction being processed;
   determining, by the computing device, from an instruction simplification table if the instruction is capable of being simplified; and
   scheduling, by the computing device, a simplified instruction based on the determination from the instruction simplification table,
   wherein the computing device is unable to access register values during instruction scheduling.

2. The method of claim 1, further comprising performing at least one of:
   a memory read of the simplified instruction;
   an execution of the simplified instruction;
   a writeback of data resulting from the execution of the simplified instruction; and
   a commit of data resulting from the execution of the simplified instruction.

3. The method of claim 1, wherein receiving processor instructions further comprises at least one of:
   fetching, by the computing device, the processor instructions from an instruction cache; and
   decoding, by the computing device, the processor instructions.

4. The method of claim 1, wherein determining if instruction simplification is enabled for the instruction being processed further includes:
   determining, by the computing device, from an instruction simplification register file if registers used by the instruction contain values of interest.

5. The method of claim 4, wherein the instruction simplification register file is in communication with the instruction simplification table.

6. The method of claim 1, wherein the instruction simplification table is only able to simplify specific instructions in an instruction set architecture.

7. The method of claim 1, wherein the instruction simplification table is a lookup table.

8. A device comprising:

a processor; and a non-transient computer readable memory having stored thereon machine readable instructions which when executed by the processor configure the device to:

receive processor instructions;

determine if instruction simplification is enabled for an instruction being processed;

determine from an instruction simplification table if the instruction is capable of being simplified; and schedule a simplified instruction based on the determination from the instruction simplification table, wherein the device is unable to access register values during instruction scheduling.

9. The device of claim 8, wherein the machine readable instructions further configure the processor to at least one of:

read a memory of the simplified instruction;

execute the simplified instruction;

writeback data resulting from the execution of the simplified instruction; and commit data resulting from the execution of the simplified instruction.

10. The device of claim 8, wherein during receiving processor instructions, the machine readable instructions further configure the processor to at least one of:

fetch the processor instructions from an instruction cache; and decode the processor instructions.

11. The device of claim 8, wherein during determining if instruction simplification is enabled for the instruction being processed, the machine readable instructions further configure the processor to determine from an instruction simplification register file if registers used by the instruction contain values of interest.

12. The device of claim 11, wherein the instruction simplification register file is in communication with the instruction simplification table.

* * * * *